July 1, 1947. W. W. GARY 2,423,309
METHOD OF PRODUCING CATALYTIC CLAY PELLETS
Filed July 3, 1943 4 Sheets-Sheet 3

WRIGHT W. GARY,
INVENTOR.

BY *Philip Subkow*

ATTORNEY.

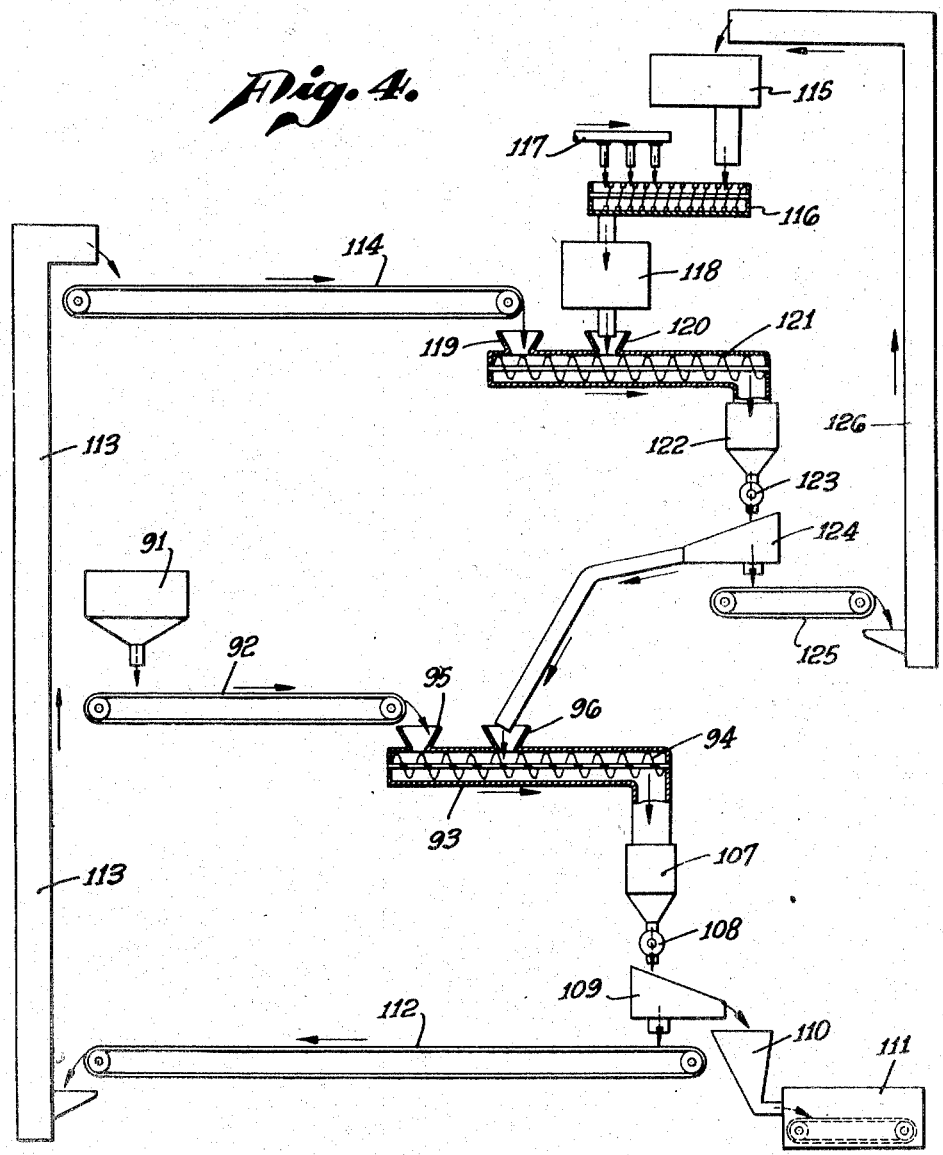

Patented July 1, 1947

2,423,309

UNITED STATES PATENT OFFICE 2,423,309

METHOD OF PRODUCING CATALYTIC CLAY PELLETS

Wright W. Gary, Los Angeles, Calif., assignor to Filtrol Corporation, Los Angeles, Calif., a corporation of Delaware Application July 3, 1943, Serial No. 493,489

3 Claims. (Cl. 252—259.2)

This invention relates to a process and apparatus for the separation of volatile materials present in porous materials. It is particularly adapted to the desorption of porous material such as, for instance, formed particles produced from clays. One of the most useful applications of my process is for the drying of pellets made from acid-treated sub-bentonite clays.

The usual process for the removing of volatile material such as water from an article such as ceramic ware, or any other material, is by a drying operation in which the material is raised in temperature until the volatile material, such as water, has its vapor pressure raised sufficiently to cause its distillation. Many articles are heat-sensitive and have their useful properties impaired by the drying operation. For many articles such as ceramic ware, and I have also found for pellets formed from acid-treated clays and other granular material, the heating necessary to produce the required evaporation of the moisture or other liquid adsorbed or mixed therewith induces strains in the article being dried sufficient to cause an undesirable body weakness. Such articles may be weakened by the initial heating necessary to drive off the first portion of their water content, yet may be dried without impairment of their strength if they are partially dried under carefully controlled conditions and then heated to remove the residual moisture content.

I have discovered that this separation of moisture or other volatile material from formed or other articles or particles, as for example, the desorption of an adsorbate from an adsorbent particle or article, may be efficiently and simply performed by surrounding the article intimately with a solid adsorbent for the sorbate which it is desired to remove from the formed article. Thus, I may accomplish this result satisfactorily by the introduction of the moist article, in which case the adsorbate is water, to be dried into a bed of adsorbent granules having a higher adsorbent power for the water (adsorbate) so that the granules surround the individual moist particles to dust them. The granules may be made of a material having a higher adsorption power for the adsorbate or be made of the same material as the particle or article to be desorbed but containing a lower content of the adsorbate. For instance, in drying ceramic material or molded clay, such as pelleted clay catalyst, I have succeeded in materially reducing the moisture content of the formed material by dusting the pellet with dry clay having a high water-adsorption capacity and permitting the article intimately mixed with the adsorbent to come to equilibrium or to approach equilibrium. I have thereby obtained a material reduction in the moisture content of the article without imparting any material amount of heat to the article.

My process is particularly adapted to the drying of articles formed from granular solid adsorbent material where the article to be formed requires the presence of a material amount of moisture in admixture with the granular material. Thus, my process may be applied to forming pellets from granular material such as catalysts which are formed as granules in their method of manufacture or may be formed by depositing catalytic material on granular supports. Such an operation is exemplified by the production of pellets of catalyst material from acid-treated sub-bentonite clays. In such cases the granular acid-treated clay is admixed with a substantial amount of water and formed into the desired shape. In my process the granular material which is to be employed in the formation of the pellets is intimately mixed with the wet pellets and in such admixture removes water from the wet pellets to itself become moisture laden, and thus I, at the same time, dry the pellet and impart a portion of the moisture necessary for the pelleting operation. In the following discussion I will describe the application of my process to the particular case of the formation of pellets suitable for use in a catalytic process such as catalytic cracking of petroleum oil, in which application I have been able to dry the pellets in an unexpected and simple, efficacious manner to produce pellets of high mechanical strength. It is, as well, applicable to other types of material and to other types of drying. The granules employed may be mixed with additional material such as plastic clays, binders, or combustible fillers which may be burned out of the pellet on subsequent treatment of the pellet.

The principles of the invention here described may be applied to other types of material to which the principles of my invention are applicable in accordance with the spirit thereof as herein described.

This invention will be further understood by reference to the drawings, in which:

Fig. 4 illustrates a counter-current drying operation employing the process of my invention.

Figure 1:
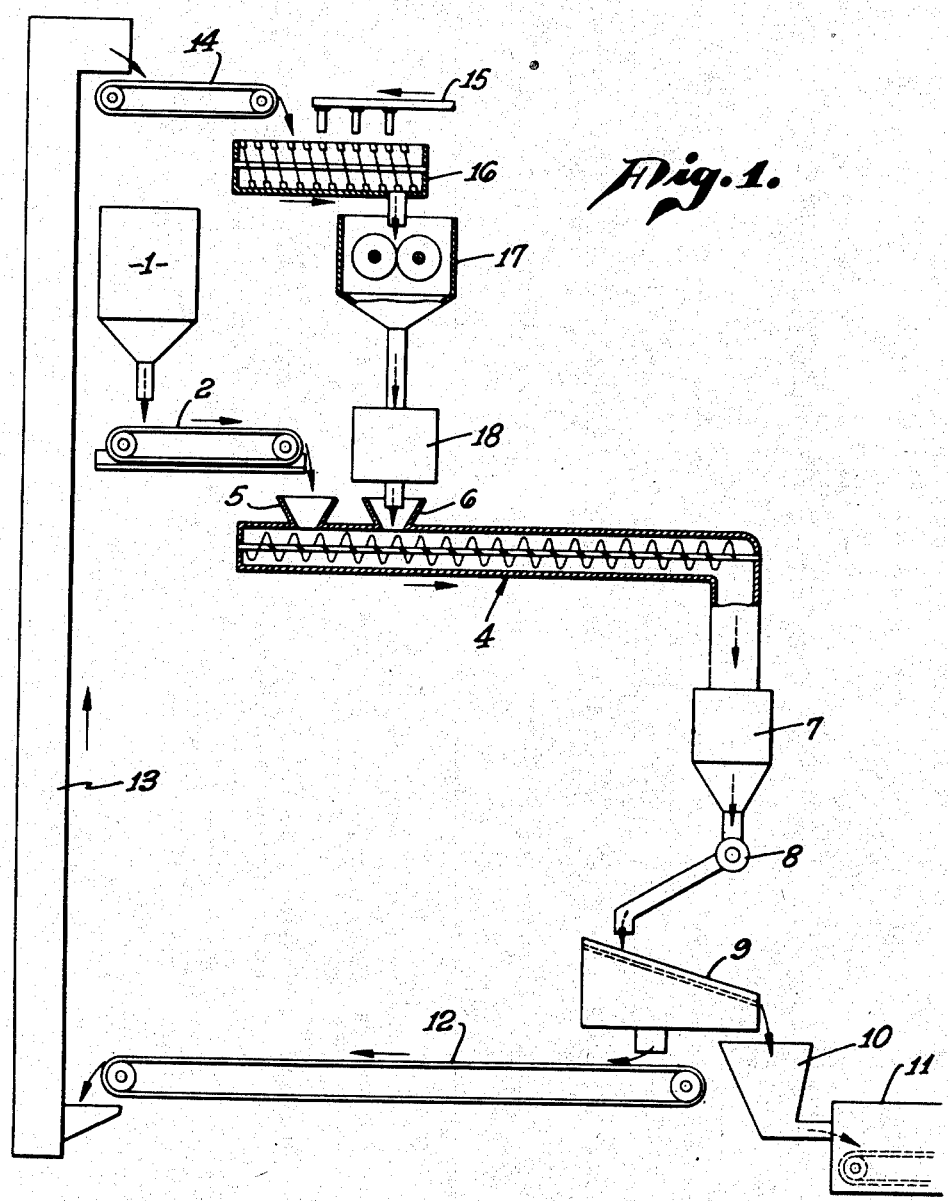
Fig. 1 is an illustrative schematic view for a single stage drying operation employing the process of my invention.

In Fig. 1, 1 is a bin which contains the dry adsorbent material to be used in drying the formed articles, for example, the pellets as hereinafter described. In applying the process to the formation of pellets from acid-treated clays, bin 1 may contain acid-treated sub-bentonite clay, for example, a clay having the following composition on a volatile free basis:

| | Per cent |
|---|---|
| $SiO_2$ | 71.5 |
| $Al_2O_3$ | 16.3 |
| $Fe_2O_3$ | 2.43 |
| CaO | 2.26 |
| MgO | 4.54 |

To produce such a clay, I leach a native clay with sulfuric acid, employing 30 pounds of acid (calculated as anhydrous $H_2SO_4$) based on 100 pounds of clay (calculated as volatile free) employing the acid in 15% concentration based on the total water content of the clay-sulfuric acid mix. The original native clay has the following composition on a volatile free basis:

| | Per cent by weight |
|---|---|
| $SiO_2$ | 67.3 |
| $Al_2O_3$ | 19.5 |
| $Fe_2O_3$ | 1.8 |
| CaO | 3.2 |
| MgO | 6.9 |
| MnO | 0.8 |
| $Na_2O$ | 0.2 |

The extraction of the clay from the acid is followed by a washing operation in which substantially all the acid and salts are removed. The clay is then filtered and dried to the desired volatile matter content which may range from about 10% to 25%. The clay is then ground and separated to form a fraction of which 85% to 87% will pass a 200 mesh screen. The specification of the method of producing the acid-treated clay is not intended to be limiting, but for the purpose of illustrating my invention. Throughout this description, wherever volatile matter is referred to it shall be referred to as "V. M." I shall also refer to the hardness of the pellet. By this term I mean the volatile matter as determined in the following manner:

Five grams of the catalyst are placed into a 20 cc. crucible and ignited in an electric furnace for 30 minutes at a temperature of at least 1800° F. and cooled in a desiccator.

$$\% \text{ volatile matter} = \frac{\text{loss of weight M 100}}{\text{weight of ignited clay}}$$

The clay is fed from bin 1 at a controlled rate by means of the poidometer 2 and is fed into hopper 5 of the mixer conveyer 4. It is fed by the screw under the hopper 6 into which the pelleted clay is introduced. The pellets drop onto the bed of powdered clay. The clay dusts and envelops the particles of pelleted material. Because the pellets drop into the clay and become dusted thereby, they are prevented from agglomerating with each other and are kept as discrete pellet particles.

In the particular example hereinafter described, I employ cylindrical pellets $\frac{1}{16}''$ in diameter and $\frac{1}{16}''$ long, although various sizes are equally adaptable to my process. The clay and the pellet particles discharge from the conveyer 4, thoroughly mixed, into a detention zone 7, such as a bin. The bin is of such size that the proper detention time necessary will permit the attainment of the desired desorption. It will be found in many cases, particularly when the amount of desorption is relatively small, that the bin may be made small or be entirely avoided.

The discharge of the zone 7 is controlled by a valve 8 operating to discharge the mixed clay and pellets from the zone 7 at the desired rate. The clay and pellets discharge onto a vibratory screen 9 which gives to the pellets the desired agitation necessary to remove the clay with which it has become dusted and to separate the free clay from the pellets. The pellets of proper size are discharged from the screen and may be passed to storage if they have their proper moisture content or passed to the drying oven 11.

The clay and any off-size pellets are discharged through a separate opening from the screen onto a conveyer 12, carried by an elevator 13 to a conveyer 14, passed to a pug mill or agitator 16 into which the necessary amount of water is added via 15. The pellet mix is passed to rolls 17 which form the clay into thin flakes which are introduced into the pellet-forming machine 18, which may be of the extruder type as is conventional in the pelleting of the clay. This extruder forms the pellets of proper size, for example, the $\frac{1}{16}''$ pellets previously referred to. The degree of desorption obtained may be increased by increasing the ratio of dry clay to wet pellet or by decreasing the V. M. content of the dry clay. A specific example of the operation of this desorbing operation and the advantages thereby obtained will appear from the following illustrative Example 1:

Example 1.—Acid-treated clay, such as is suitable for catalytic cracking of petroleum oil, having a mesh size of 85% to 87% through a 200 mesh screen and having a volatile matter content of 21.7% is contained in bin 1. This clay contains 54 parts of volatile free clay and 14.95 parts of moisture. It is fed by means of a poidometer 2 at the rate of 78.3 parts of clay per unit of time. It is mixed in the mixer conveyer 4 with 100 parts of pellet, discharging from extruder 18 in the same unit of time. The pellet had a 46% V. M. content, i. e., is composed of 54 parts of volatile free clay and 46 parts of water. After one hour's detention in zone 7, it is fed by means of control 8 at the rate of 178.3 parts in the same unit of time. It is separated on screen 9 at the rate of 94.2 parts of dried pellet having a V. M. content of 40.2, and granular material which is deposited on conveyer 12 at the rate of 92.4 parts having a V. M. content of 36.2%. The pellet is reduced in moisture content in drier 11 to a V. M. content of 20%. If the wet pellet from the extruder had been passed directly to the drier without the desorbing stage herein described, it would be necessary to remove from the 100 parts of pellet 32.5 parts of water, whereas by the intermediate drying operation here introduced it is necessary to remove but 22.7 parts of water in the drier, thus causing a reduction in load on the drier of about 30%. The wetted clay is mixed with additional amounts of water to give a mixture containing 47% V. M. and passed via the rolls to the extruder.

I may increase the desorption, i. e., the reduction in moisture content of the clay, by controlling the ratio of the adsorbent dry clay to the wet pellet.

I may also increase the desorption of the wet pellet by employing adsorbent clay of lower V. M. content in bin 1, for example, having a V. M. content of 15%. Employing one part by weight of 47% V. M. pellet on a volatile free basis to one part of clay on a volatile free basis, I am able to produce dried pellets having a V. M. content of 37% V. M. and a wet clay of 32.5% V. M.

In all of the above procedures I therefore am able not only to reduce the amount of moisture which must be evaporated in the drier 11, but I am also able to reduce materially the amount of water that it is necessary to add in the pelleting operation. By employing a clay of sufficiently low V. M. content and in the proper weight ratio to the pellets, I can produce pellets of low V. M., say 15 to 20% or lower, without any drying.

While I have described this operation in connection with the drying of formed articles such as pellets, it will be clear that the process is equally applicable to the drying of granular material. In this case I mix the wet granular material with the powdered dry material by feeding the granular wet material into the granular dry material in the manner previously described in connection with the pellets so that the dry material dusts and surrounds the wet material and the mixture may then be given the time necessary to establish the moisture equilibrium desired. This procedure is particularly applicable to an operation in which the wet material has a different particle size from the dry material. In such case after the moisture equilibrium has been established the particles may be separated by screening in the manner previously described to remove a dried granule and a wetted granule. The latter may then be dried in any desired manner for re-use.

Figure 2:
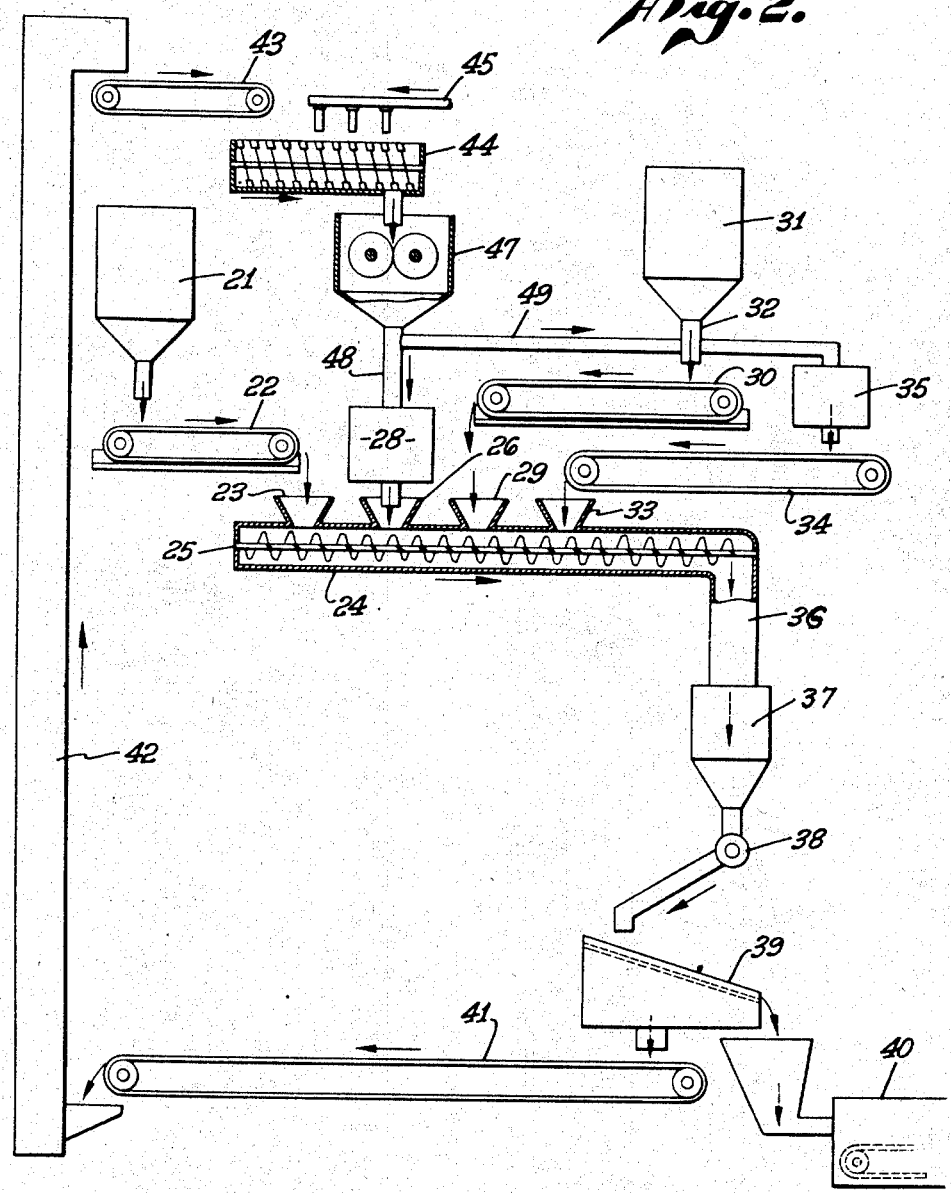
Fig. 2 illustrates a stage drying operation according to my process.

Fig. 2 shows a modified form of the desorption process in which the pellets and the clay are added in stages in the desorbent mixture. Dry clay in bin 21 is fed in regulated amounts by poidometer 22 into the funnel 23 of mixer 24. The clay is moved by the screw conveyor 25 under the funnel 26 into which is fed pellets from the extruder 28. The mixed powder and pellets move under the funnel 29 into which is fed a regulated amount of additional dry clay fed by poidometer 30 which receives the clay from conveyer 32 carrying the clay from bin 31. The clays in bins 21 and 31 may be the same clay or they may have different volatile matter contents. Thus, the bin 31 may contain a clay of either higher or lower volatile content than the clay of bin 21 so long as the volatile content of the clay in bin 31 is less than the volatile content of the pellets which are fed by the screw underneath the funnel 29. The mixture is thus intimately formed and moved until it passes under the funnel 33 which receives pellets from conveyer 34 onto which the extruder 35 discharges its pellets. Extruder 35 may be the same as the extruder 28 or may be another one of a plurality of extruders. The mixed clay and pellets are discharged through discharge outlet 36 into a retention drum 37 from which they are discharged by regulating valve 38 at the desired rate onto a screen 39 from which the dried pellets are discharged into the drier 40. The off-size pellets and the wetted clay are carried by conveyer 41 to elevator 42 and by conveyer 43 to the pug mill 44 wherein the desired amount of water is added to spray 45. The mixed water and clay are then discharged through rolls 47 which flake the clay and then are passed by proportioning devices, the desired proportion going to extruder 28 via conveyer 48, and the other portion passing by conveyer 49 to extruder 35.

Figure 3:
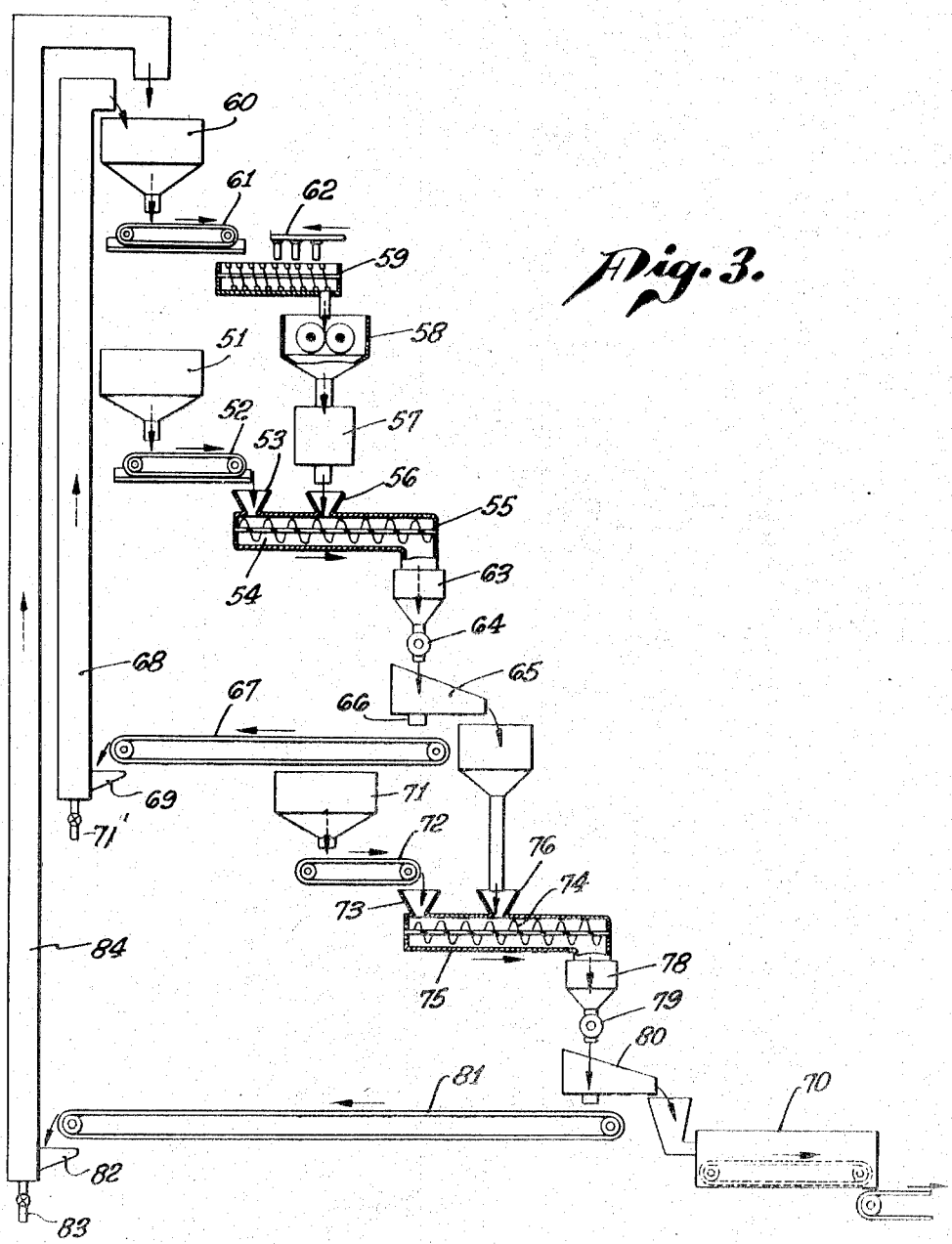
Fig. 3 illustrates an additional stage drying operation.

Instead of proceeding in the manner described in connection with the flow diagram of Fig. 1 or 2, I may employ the drying process in stages as is illustrated in the flow sheet of Fig. 3.

Clay of desired moisture content contained in bin 51 is fed by poidometer 52 into funnel 53 into mixer. Screw 54 feeds the clay under funnel 56 which receives pellets from extruder 57. The extruder 57 is fed by partially moistened clay from bin 60 passing in regulated amounts by way of poidometer 61 into the pug mill 59 wherein it receives additional water from spray 62 to adjust the water content of the clay for that desired for proper extrusion. The mixture passes through rolls 58 which flake the clay. The flakes are then fed to the extruder 57 which feeds the pellets, as stated, into the hopper 56. The clay and pellets are mixed in a mixer 55 and are discharged into the retention zone 63. They are discharged from the retention zone 63 to the screens 65 and the moistened clay and the off-size pellets are discharged through 66 to the conveyer 67 which feeds the pellets into a bin 69. From the bin 69 part or all of the pellets may be discharged through outlet 71' or may be passed by elevator 68 into the bin 60. The partially dry pellets may discharge into the drier 70, or additional clay having the same or different V. M. from the clay in bin 60 contained in bin 71 is fed by poidometer 72 in measured amounts into the funnel 73 of mixer 75. The clay is carried by screw 74 under the hopper 76 whereupon the partially dried pellets are again mixed with the additional clay and are discharged into the retention drum 78 and via the regulating valve 79 fed into the screens 80 which separate the clay from the off-size pellets, the dry pellets passing from 80 to storage or into a drier 70 or to additional stages of clay contact in the manner previously described for stages 1 and 2, Fig. 3. The off-size pellets and wetted clay pass by conveyer 81 to bin 82 from which they may be discharged in whole or in part through discharge 83 or carried by conveyer 84 to bin 60. Thus, where the pellet mix contains 46% water, the clay is added at a rate sufficient to abstract 10 parts of water per 100 parts of pellet mix fed to the mixer 59. The pellet thus discharged to 76 will have a 40% V. M. The pellet may be further dried by mixing it in a second-stage mixer 75 with another portion of the same adsorbent clay or with another clay of different V. M. content. The pellet may then be brought to a still lower V. M. by abstracting additional water from the pellets. The drier pellets from the second stage are separated into dried pellets and moistened clay via conveyer 81. The separated pellets may then be further dried in a drier to the desired V. M. of say 15% to 20%. The wet clay from the several stages of drying may be passed, in part or in its entirety, to a drier or storage, or may, in part or whole, be mixed to form the pellet charge in bin 60.

Thus the succeeding doses of the dry clay which are contacted with the partially dried clay may be of the same V. M. or of a different V. M. content. Thus, in employing a pellet of 47% V. M., I may employ an equal amount of clay of 27% V. M., calculating the pellet and the clay on a volatile free basis. This will produce a pellet of about 40% V. M. and a clay of about 36 to 37% V. M. The pellet having a 40% V. M. content may then be contacted with a clay of 15% V. M. content in the ratio of 1 part clay on a volatile free basis to one part pellets on a volatile free basis to produce a clay of about 26% V. M. and a pellet of 33% V. M. I may employ instead of the 15% V. M. clay another portion of the original clay having 27% V. M. and employ this clay in the desired proportion to give the desired V. M. content.

In Fig. 4 I have illustrated a counter-current method of desorption whereby increased desorbing efficiency may be obtained.

Dry clay in storage bin 91 which is obtained by acid treatment of clay and drying, as described hereinabove, is passed via the poidometer 92 in regulated amounts and fed into the mixer 93 via hopper 95. The screw 94 feeds the clay under hopper 96 into which partially desorbed pellets pass from the screen 124. The pellets are surrounded by the clay and pass as discrete pellets encased with desorbing clay into the storage bin 107. The storage bin is of such size as to give the desired retention time necessary to establish the desired desorption. The desorbed pellets and moistened clay pass via the discharge valve 108, which is operated to maintain the desired rate of flow, onto the screen 109. The desorbed clay may be discharged from the screen via conveyer 110 either to storage or to the drier where its moisture content may be further diminished. The partially wetted clay, together with any off-size pellets discharging from the screen 109, pass via conveyer systems 112, 113, and 114 into the hopper 119 of mixer 121, and are passed under the hopper 120 which receives the wet pellets of the extruder 118. The clay-pellet mix passes to the detention bin 122 where the clay and the pellets are retained for the time necessary to give the desired redistribution of moisture between the pellets and the clay. They are fed at the desired rate through the control valve 123 to the screen 124. Here again the pellets are separated from the off-size pellets and the clay. The partially dried pellets pass to the hopper 96 and the wet clay passes via conveyer systems 125 and 126 to the hammermill 115 where any off-size pellets are reduced to the desired size for re-extrusion with the wet clay. The clay mix passes to the pug mill 116 where it receives additional water added through 117 to adjust the moisture content for proper extrusion in the extruder 118.

While in Figs. 1 to 4, inclusive, the absorbent clay is described as being the same clay as is used in forming the pellets, it may be any other adsorbent which may be separated from the pellets. Thus, it may be native clay used in forming the acid-treated clay employed in the pelleting operation. The clay employed as a desorbent may be modified by addition of catalyst promoters or by addition of binding agents or combustible fillers which may, by being burned out of the pellet, increase the porosity of the pellet. These binding agents, combustible fillers, or catalyst promoters may, however, be added to the pellet mix along with or in addition to the water used in preparing the pellet mix going to the pellet-forming machine.

While I have described a particular embodiment of my invention for the purpose of illustration, it should be understood that various modifications and adaptations thereof may be made within the spirit of the invention as set forth in the appended claims.

I claim:

1. A method of producing dry catalytic pellets of acid-treated montmorillonite clay, which comprises forming moist pellets from wetted granules of said acid-treated clay, mixing said pellets with relatively dry granules of said acid treated clay to wet said last-named granules and dry said pellets, separating the pellets from the granules wetted by said transfer of moisture, mixing additional water with the last named wetted granules, and forming additional first-named moist pellets from the last named wetted granules.

2. A method of producing dry catalytic pellets of acid-treated montmorillonite clay, which comprises forming moist pellets from wetted granules of said acid-treated clay, introducing said moist pellets into a bed of relatively dry granules of said clay, mixing said pellets with the granules for a time sufficient to transfer moisture from said article to said granules whereby the pellets become coated with the granules, separating the pellets from the granules wetted by said transfer of moisture, mixing additional water with the last named wetted granules, and forming additional first-named moist pellets from the wetted granules.

3. A method for producing catalytic acid-treated montmorillonite clay pellets, which comprises forming pellets from moistened acid-treated montmorillonite clay granules, introducing said pellets into a bed of relatively dry granules of acid-treated clay, separating the partially dried pellets from the moistened clay granules, again introducing the partially dried pellets into a bed of drier granules of acid-treated montmorillonite clay drier than said partially dried pellets, separating the desorbed pellets from the moistened clay, employing the moistened granules thus separated as the granules for contacting the first-named pellets, mixing the moistened clay granules separated from the first-named pellets with water, and employing said mixture for the first forming of pellets.

WRIGHT W. GARY.

REFERENCES CITED

The following references are of record in the file of this patent:

UNITED STATES PATENTS

| Number | Name | Date |
| --- | --- | --- |
| 2,119,615 | Wendeborn | June 7, 1938 |
| 1,759,737 | Eckerbom | May 20, 1930 |
| 1,979,124 | Tival | Oct. 30, 1934 |
| 2,024,131 | Newton et al. | Dec. 10, 1935 |
| 1,623,017 | Cristoph | Mar. 29, 1927 |
| 613,267 | Gruene | Nov. 1, 1898 |
| 916,267 | Jessup | Mar. 30, 1909 |
| 1,673,891 | Stehli | June 19, 1928 |
| 2,139,026 | Matheson | Dec. 6, 1938 |
| 2,150,031 | Hatfield | Mar. 7, 1939 |
| 2,330,098 | Watts | Sept. 21, 1943 |